Sept. 29, 1959

D. E. ERICKSON
AUTO CARRIER 2,906,405

Filed Feb. 16, 1956

INVENTOR.
DENNIS E. ERICKSON
BY Brown, Jackson
Boettcher & Dienner
ATTYS.

Sept. 29, 1959          D. E. ERICKSON                 2,906,405
                         AUTO CARRIER Filed Feb. 16, 1956                               3 Sheets-Sheet 2

INVENTOR.
DENNIS E. ERICKSON
BY
                ATTYS.

Sept. 29, 1959    D. E. ERICKSON    2,906,405
AUTO CARRIER

Filed Feb. 16, 1956    3 Sheets-Sheet 3

INVENTOR.
DENNIS E. ERICKSON
BY
ATTYS.

United States Patent Office 2,906,405
Patented Sept. 29, 1959

2,906,405

AUTO CARRIER

Dennis E. Erickson, Battle Creek, Mich., assignor to Clark Equipment Company, a corporation of Michigan Application February 16, 1956, Serial No. 565,980

2 Claims. (Cl. 211—13)

The present invention relates generally to freight handling and transporting means and more particularly to improvements in portable freight carrier structures especially adapted for the transporting of automobiles or like vehicles.

In general, the freight carrier means of this invention pertains to the general class of portable freight carrier means and the freight handling system set forth in the copending application Serial No. 531,489, now abandoned, filed in the name of Jack E. Loomis, on August 30, 1955, and entitled "Freight Handling Means and Method." Broadly speaking, my invention is directed to freight handling systems and equipment in which the transportation of freight takes place in portable carriers adapted and arranged for hauling on normal freight transporting means such as railway flat cars, ships, aircraft, trailer trucks and the like, as set forth more fully in the referred to Loomis application. Briefly, the present carrier comprises a device for the storage and transportation of automobiles; such device or carrier being engageable by conventional material handling equipment for movement onto and off of a supporting surface of a freight transporting means such as a railway flat car. The carrier of this invention includes a substantially rectangular planar base structure on which is supported a collapsible cage adapted to handle and store automobile parts or complete automobiles. The cage structure includes a pair of parallel spaced superimposed platforms or supports available through conventional loading ramps whereby the automobiles or vehicle parts may be effectively loaded onto my carrier means. Means are embodied in the base structure of the device for engagement by the forks of a conventional fork lift truck or the device in certain instances may be effectively handled by a straddle truck means, crane hoist or other material handling devices as desired.

The main object of this invention is to provide a new and improved collapsible portable freight carrier means especially suited for the transportation of automobiles or like vehicles.

A still further object of this invention is to provide a new and improved portable freight carrier means as aforesaid, which provides platform supports for at least two automobiles or like vehicle structures to the end that the same may be transported in a convenient and compact device capable of being handled by conventional material handling equipment.

An additional object of the invention is to provide a new and improved freight carrier means of the class aforesaid, in which means are embodied for collapsing the structure of the carrier to promote its storage and reduce its bulk in instances where the same is not employed in the active transportation of automotive vehicles or the like.

The above and further objects, features and advantages of this invention will be recognized by those familiar with the art from the following detailed description and specification of a preferred form of carrier means embodying the concepts of this invention as shown in the accompanying drawings.

Figure 1:
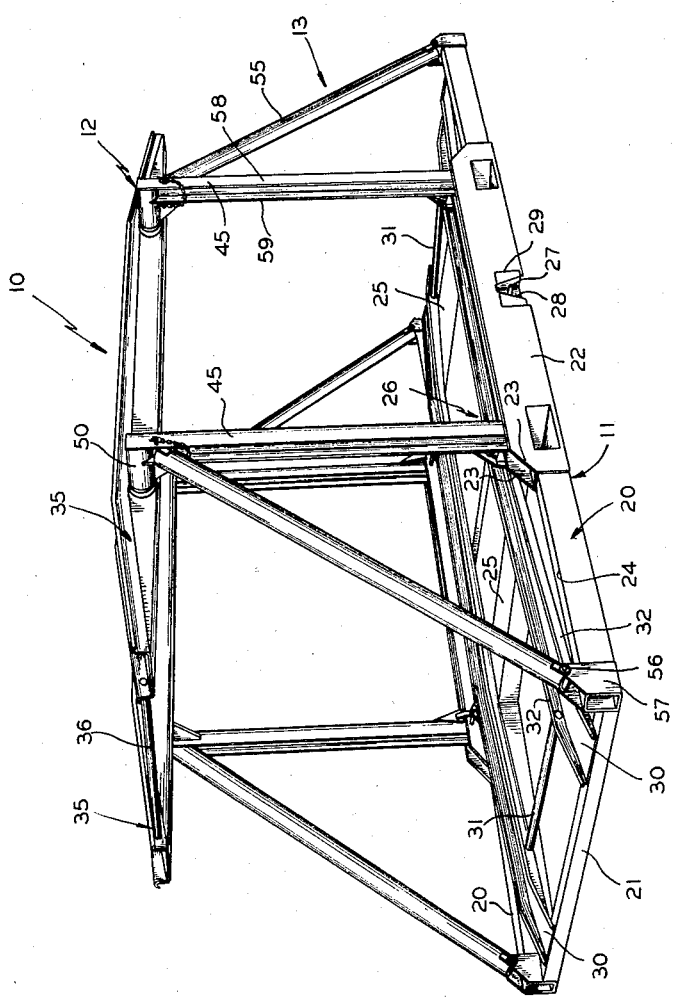
Figure 1 is a perspective showing of a preferred form of auto carrier constructed in accordance with the concepts and teachings of my invention.

Turning now to the features of my invention as shown in the accompanied drawings, it will be recognized from Figure 1 especially, that an improved portable freight carrier 10 therein illustrated is arranged and adapted for the transportation and storage of automobile parts or complete automobiles; the particular form illustrated being adapted for transporting two complete automobiles. In general, the device 10 may be thought of as including a planar base structure 11, an elevated platform structure 12 and an elevating support structure 13 disposed intermediate said base structure 11 and said elevated platform structure 12.

The base structure 11 includes a pair of elongated side frame members or rails 20, 20 which are interconnected by cross bars 21, 21 to form a rigid rectangular structure. The side rails 20 are fabricated substantially at their mid-section with a strengthened or buttress portion 22 comprising steel or metal channels of increased cross-section. One such strengthened portion 22 is located on each side of the carrier 10 and such two portions include spaced wall portions 23, 23 which extend above the upper face 24 of the main longitudinally extending side rails 20.

The buttress portions are invaded by channel members 25 constituting cross-connecting members which present elongated open end pockets for the inserted reception of fork tines of a material handling fork lift truck (not shown herein). Such channel members 25 are spaced apart according to the normal spacing of the tines on the fork lift truck and on opposite sides of a centrally disposed latching structure indicated generally at 26 and capable of being engaged upon the insertion of the lift fork into the interior pockets of the channel members 25. Such engagement of the latch mechanism withdraws pin means 27 which extend outwardly of substantially triangular guide ways 28 formed in cast pads 29 mounted in the strengthened portions 22 of the side rails. The pins 27 cooperate with anchor means on the transportation means to lock the carrier thereto, all as set forth in the referred to Loomis application.

The base structure 11 further includes a pair of parallel spaced ramp channel members 30, 30 welded or otherwise rigidly secured to the cross-connecting bars 21, 21 and provided with cylindrical rails or cross-connecting rods 31. Such rods 31 are disposed intermediate and adjacent the opposite ends of the ramp members 30 for purposes which will be amplified presently. It will be regarded that the ramp members 30, 30 are inclined at their ends and present upwardly projecting side walls 32, 32 for guiding the wheels of the automobile therebetween in loading the vehicle onto the ramp members 30, 30.

Figure 3:
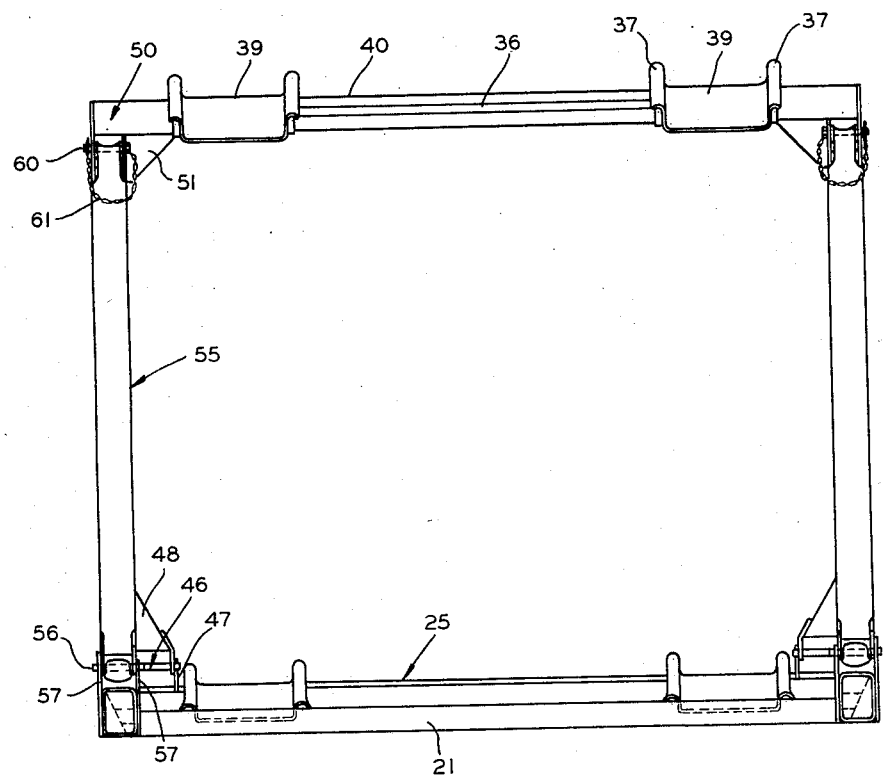
Figure 3 is an end elevational view of the same.

The elevated platform structure 12 includes a pair of parallel spaced elongated ramp members 35, 35 interconnected adjacent their ends by cross rods 36 which correspond to rods 31 of the lower base structure. Such rods 31 and 36 provide a convenient support for attaching anchoring means, such as chains or cables, required to hold the automobiles in position on the ramp members 30 and 35 in transit. Ramp members 35 correspond substantially to the ramp members 30 for the lower base structure although the same are slightly shorter than such lower positioned ramp members. Additionally, each of the ramp members 35, 35 includes upwardly extending side wall portions 37, 37 for guiding the wheels of an automotive vehicle thereon. It will be noted further that each ramp member 35 bears an inclined portion or section adjacent its opposite ends for receiving and guiding the automobile onto and across a central horizontally disposed platform portion 39 thereof. Cross-connecting rails 40, 40 constituting tubular members serve to interjoin and support the upper ramp members 35, as best seen in Figure 3 of the drawings. In this regard, it will be noted that the cross-members 40 parallel the cross-tie members 21 of the lower base structure so that the elevated platform structure 12 lies in substantially coextensive superposed relation with respect to the lower base structure 11.

The intermediate supporting structure 13 includes, at each side of the carrier, a pair of upright or vertical stanchions 45, 45 which are pivoted at their lower ends on axles 46 that extend between the wall portions 23, 23 of the strengthened section 22 in the side rails 20 and a bracket 47 mounted inwardly thereof on the upper face of the channel members 25. It will be noted that a substantially triangular gusset 48 extends from the inside face of each vertical stanchion and joins with an ear portion 49 adjacent its lower end; such ear receiving the axle 46 for pivotally mounting the lower ends of the stanchions 45 to the side rails 20.

The upper ends of opposed stanchions 45 on opposite sides of the carrier are interjoined by a tubular trunnion shaft 50 which is fixed at its ends to the stanchions and gusset members 51. The tubular trunnion members are each received within the hollow interior of one of the cross-ties 40 so that the trunnion members may rotate with respect to such fixed cross-tie members 40 to provide pivotal connection between the elevated platform structure 12 and the support structure 13. With this arrangement, it will be recognized that the structure thus far described comprises a parallelogram linkage whereby the upper platform structure 12 may be shifted from a lowered position adjacent the lower base structure 11 to its elevated position, as shown in Figure 1 for example, the stanchion members 45 scribing arcuate paths during such shifting operation.

The intermediate supporting structure 13 includes in addition to the upright stanchion 45, angle stanchions 55 of which there are four, one associated with each of the upright stanchions 45. The angle stanchions 55 extend from the outer ends of the side rails 20 to substantially the upper ends of the upright stanchions 45 at an incline to the horizontal approximating 45°. The lower ends of the angle stanchions 55 are pivotally attached as by pin means 56 to extending ear portions 57 at the opposite ends of the side rails 20, as best shown in Figure 3. The upper ends of the inclined or angle stanchions 55 are likewise fitted between spaced walls 58 and 59 of the upright stanchions 45 which preferably constitute I-beams. The attachment of the upper ends of the inclined stanchion to the upright stanchions is accomplished by removable pin means 60 provided with a chain keeper 61 thereon to prevent its loss.

Figure 2:
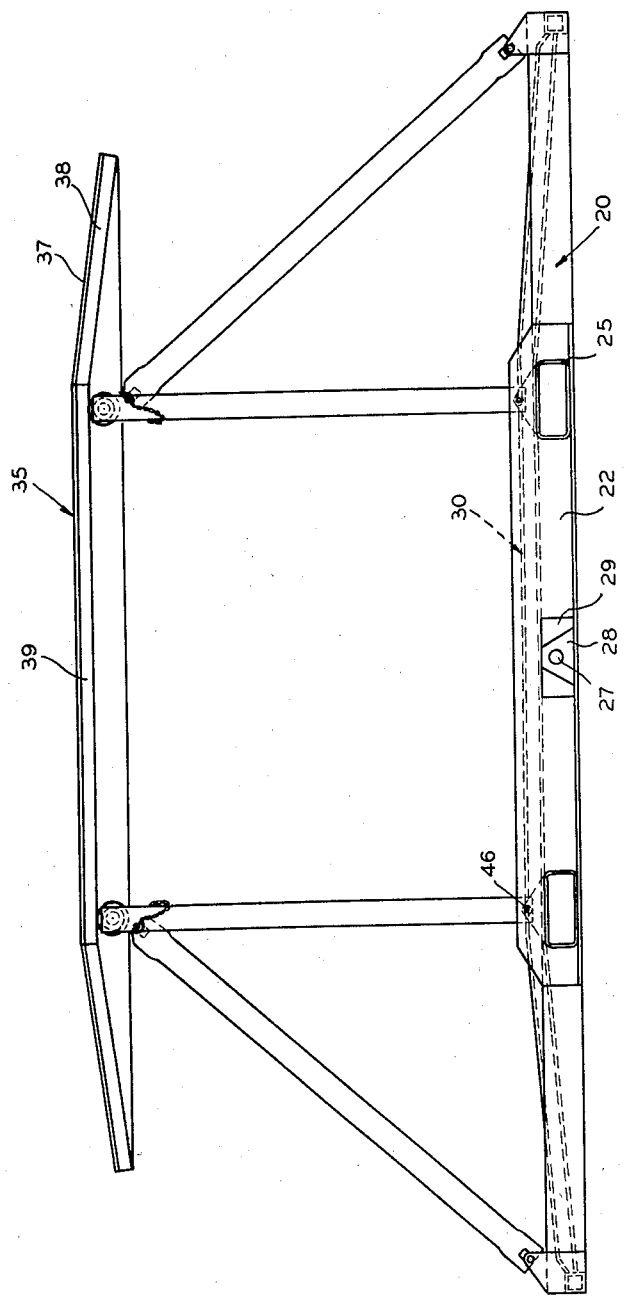
Figure 2 is a side elevational view of the carrier set forth in Figure 1.

It will be understood by removing the pin means 60 from the inclined stanchions 55, the latter may be swung arcuately from their inclined position to a horizontal position thereby permitting the lowering of the elevated platform structure 12. In this regard, it will be appreciated that if the upright stanchions 45 are moved clockwise, for example, as viewed in Figure 2, to permit the lowering or storage of the upper platform structure in a position of superposed adjacency with the lower base structure 11, the inclined stanchions 45 located at the left hand end of the carrier, as viewed in Figure 2, will likewise rotate or move clockwise in following the adjacent vertical stanchions 45 so as to rest on top of the side rails 20. The inclined stanchions 55 located at the opposite or right hand end of the carrier, will likewise be moved clockwise, but such will extend beyond the ends of the side rails 20 when collapsing the device.

From the foregoing, it is believed that those familiar in the art will recognize the merit and novel concepts of the improved collapsible automobile carrier hereinabove described and will further appreciate that while I have disclosed my invention in association with a preferred embodiment of its concepts, numerous variations, changes, modifications and substitutions of equivalents may be made therein without necessarily departing from the spirit and scope of my invention. As a consequence, it is not my intention to be limited to the particular form and features of the device herein described and shown except as may appear in the following appended claims.

I claim:

1. A portable freight carrier means adapted to be loaded and unloaded onto and off of a supporting surface of a freight transporting means by an industrial fork lift truck for transporting automobiles or like wheeled vehicles, comprising, a substantially rectangular planar base structure, a pair of parallel spaced vehicle supporting ramp members supported in spaced parallelism longitudinally of said base strtucture, means defining fork receiving means spaced apart on said base structure for engagement by the forks of the industrial lift truck, means for locking the base structure with anchor devices projecting upwardly of the supporting surface on the freight transporting means, a platform structure superposed on said base structure and including an additional pair of parallel spaced ramp members for receiving and supporting a wheeled vehicle, a parallelogram linkage means connecting said platform structure to said base structure including members having pivotal connection with both said platform and base structures whereby the same may move arcuately to elevate said platform from a stored position of contacting adjacency with said base structure to an elevated position of spaced parallelism thereover, said platform being spaced above said base structure a distance sufficient to permit the loading of a wheeled vehicle on said base structure and said ramps on said platform being arranged to receive said wheeled vehicles when said platform is in elevated position over said base structure, inclined members for the purpose of rigidifying said parallelogram linkage and locking said platform in its said elevated position, and means detachably securing said inclined members in their rigidifying position whereby the same may be removed as desired to collapse said parallelogram linkage, said carrier with its means for engagement by the forks of the industrial lift truck thereby being so constructed and arranged to permit loading and unloading thereof and the lifting of more than one automobile when said platform is in its elevated position.

2. A portable automobile carrier comprising long and short structural means arranged to form a rectangular planar base, the longer structural means having reinforcing means at their mid-portions, parallel spaced ramp means supported on said base having their ends inclined and resting on the shorter structural means, pocket means extending transversely of the longer structural means and midway of the reinforcing means below the ramp means to reinforce the base and for the reception of fork means of a material handling device whereby the carrier may be deposited on a supporting surface, planar platform means comprising upper reinforced ramp means and transverse connecting means, said upper ramp means having inclined ends and being superimposed on said base, a supporting means including plural parallel stanchion members having pivotal connections at one of their respective ends with the transverse connection means and at their respective bottom ends with the reinforcing means on said base, such stanchion members comprising parallelogram linkage capable of elevating said upper ramp from a stored unloaded position of adjacency with said base to an elevated position in spaced parallelism thereover, and inclined stanchion means extending from the extremities of said base to adjacent the pivotal connection of the parallel staanchion members with said upper ramp to lock said ramp in its elevated position when desired, said carrier being further characterized by the feature that said inclined ends of said ramps facilitate the loading and unloading thereof with automotive vehicles while the upper ramp is in its elevated position and the carrier further being so constructed and arranged to accomplish the loading or unloading of more than one vehicle simultaneously to and from a platform by said material handling device.

References Cited in the file of this patent

UNITED STATES PATENTS

| | | |
|---|---|---|
| 1,750,129 | Romine | Mar. 11, 1930 |
| 2,261,013 | Berby | Oct. 28, 1941 |
| 2,521,088 | Phelps | Sept. 5, 1950 |
| 2,539,201 | Pasko | Jan. 23, 1951 |
| 2,639,046 | Tatosian | May 19, 1953 |
| 2,727,638 | Sestan | Dec. 20, 1955 |

FOREIGN PATENTS

| | | |
|---|---|---|
| 653,712 | Great Britain | May 23, 1951 |